United States Patent [19]

Edlin et al.

[11] 3,912,800

[45] *Oct. 14, 1975

[54] METHOD OF PRODUCING POROUS POLYMERIC ARTICLES

[75] Inventors: Frank E. Edlin, Tempe, Ariz.; Joseph M. Tucker, Jr., Wichita, Kans.

[73] Assignee: International Plastics, Inc., Colwich, Kans.

[ * ] Notice: The portion of the term of this patent subsequent to Nov. 14, 1975, has been disclaimed.

[22] Filed: Sept. 21, 1970

[21] Appl. No.: 74,210

[52] U.S. Cl. .................. 264/53; 260/2.5 B; 264/54; 264/88; 264/101; 264/DIG. 5; 264/DIG. 13
[51] Int. Cl. ............................................. B29d 27/00
[58] Field of Search ........ 264/DIG. 5, 321, 101, 51, 264/53, 88, 101, 54; 260/2.5 B

[56] References Cited
UNITED STATES PATENTS

| | | | |
|---|---|---|---|
| 2,941,965 | 6/1960 | Ingram | 264/DIG. 5 |
| 3,310,617 | 3/1967 | Dygert et al. | 264/53 |
| 3,312,760 | 4/1967 | Berner | 264/101 X |
| 3,399,098 | 8/1968 | Omoto et al. | 264/321 X |
| 3,558,753 | 1/1971 | Edlin | 264/321 X |

FOREIGN PATENTS OR APPLICATIONS

| | | | |
|---|---|---|---|
| 717,891 | 9/1965 | Canada | 264/DIG. 5 |

OTHER PUBLICATIONS

Harding, R. H., "Morphologies of Cellular Materials," In *Resinography of Cellular Plastics*, ASTM Special Technical Publication No. 414, Phila., Pa., ASTM, 1967, pp. 3–9.

Benning, Calvin J., "Plastic Foams, The Physics and Chemistry of Product Performance and Process Technology," Vol. II, New York, Wiley–Interscience, 1969, pp. 11–31, 58–59, 81–88.

Ingram, A. R.; R. R. Cobbs, and L. C. Couchot, "The Microscopical Examination of Molded and Extruded Polystyrene Foams," in *Resinography of Cellular Plastics*, ASTM Special Technical Publication No. 414, Phila., Pa., ASTM, 1967, pp. 53–55; 59–64.

*Primary Examiner*—Philip E. Anderson

[57] ABSTRACT

A method for producing porous polymeric articles from polymeric resins which can be fabricated by melt extrusion is provided wherein the polymeric resin is admixed with a thermally decomposable chemical compound to form a resulting mixture which is then extruded to form an extrudate. The mixture to be extruded is controlled so as to contain from about .05 to 2.0 weight percent of a liquid. The mixture containing the liquid is then extruded at a sufficient temperature and pressure to produce an extrudate and decompose the thermally decomposable chemical compound. The gaseous product of the thermally decomposed chemical compound and the gasified liquid produced by the extrusion process are then withdrawn through the surface of the extrudate by differential pressure while the extrudate is in a semi-molten state so that upon cooling a porous polymeric article is formed.

5 Claims, No Drawings

METHOD OF PRODUCING POROUS POLYMERIC ARTICLES

BACKGROUND OF THE INVENTION

1. Field of the Invention

This invention relates to a method of producing porous polymeric articles. In one aspect, it relates to a method of producing porous articles of a polymeric resin which can be fabricated by melt extrusion by admixing from about 0.05 to 25 weight percent of a thermally decomposable chemical compound with said polymeric resin molding powder, extruding the resulting mixture, and passing the extrudate while in a semi-molten state through a cooling zone wherein the gaseous product formed by the extrusion process is withdrawn through the surface of the extrudate by differential pressure while the extrudate is in a semi-molten state. In yet another aspect, it relates to a method for producing a porous polymeric article having up to about 200,000 pores per square inch through the article and wherein the porosity is readily controlled by maintaining from about 0.05 to 2.0 weight percent of a liquid in the mixture of the polymeric resin and the thermally decomposable chemical compound which is to be extruded.

2. Brief Description of the Prior Art

Articles produced from molding powders and pellets are well-known in the art. However, most of the molding powders and pellets of the prior art form articles with a cellular structure in which the porosity can not be controlled. Articles produced from the well-known molding powders and pellets of the prior art incorporate fillers and other additives therein to prevent the formation of uncontrolled porosity of the produced articles.

Articles produced from polymeric resins, such as acrylonitrile-butadiene-styrene polymers, are likewise known and possess the distinct advantage over articles produced by other resins in that the articles produced from such a polymer do not suffer from the disadvantage of the prior resins in that articles produced from polymers acrylonitrile-butadiene-styrene are nonporous. In many applications it is desirable to produce a porous article having a controlled porosity. A method for producing such a porous article from a polymer of acrylonitrile-butadiene-styrene or methyl methylacrylate has been disclosed in the copending patent application of Frank E. Edlin, U.S. Ser. No. 682,210, now U.S. Pat. No. 3,558,753 entitled "Porous Plastic Structure and Method of Producing Same". However, attempts to make a micro porous article from other polymers, such as polymers of aliphatic mono-1 olefins and copolymers of such, have up to this time not been possible. Therefore, means are constantly being sought to produce a micro porous article from polymeric resins which can be fabricated by melt extrusion wherein the porosity of the article can readily be controlled and the porosity can be reproduced exactly from one article to the next.

In addition, other prior art methods have been attempted for producing porous plastic articles by incorporating foreign solids into the article or resin, allowing the article to cool, and then removing the foreign solids with water or other solvents by outward difusion at temperatures up to the boiling point of the solvent. Articles produced in this manner normally contain closed cells and a number of cells that still have some foreign particulate matter therein or else the article must be subjected to a very long and intensive leaching process whereby substantially all of the cell walls are destroyed. When such occurs, the article so produced is generally a low density plastic article having greatly deteriorated physical properties and useful life. In addition, the extensive leaching period is not only time consuming but is very costly, impractical in industrial application and often produces an inferior product.

OBJECTS OF THE INVENTION

An object of the present invention is to provide an improved method for producing porous articles wherein the porosity is readily controlled.

Another object of the invention is to provide a method for producing porous articles from polymeric resins which can be fabricated by melt extrusion.

Another object of the invention is to provide a method of producing porous articles from polymeric resins which can be fabricated by melt extrusion wherein the porosity of the article can readily be controlled and the porosity can be reproduced exactly from one article to the next.

Various other objects, advantages, and features of the invention will become apparent to those skilled in the art from a reading of the specification and appended claims.

SUMMARY OF THE INVENTION

According to the present invention, a method of producing porous articles from a polymeric resin which can be fabricated by melt extrusion is provided whereby a mixture containing the polymeric resin, from about 0.05 to about 25 weight percent of a thermally decomposable chemical compound, and from about 0.05 to 2.0 weight percent of a liquid, is extruded at a sufficient temperature and pressure to produce an extrudate, while decomposing the thermally decomposable chemical compound and gasify the liquid component of the resin mixture. The gaseous products of the thermally decomposed chemical compound along with the gasified liquid are then withdrawn through the surface of the extrudate by differential pressure while the extrudate is in a semimolten state.

DESCRIPTION OF THE PREFERRED EMBODIMENTS

In the production of porous polymeric articles from polymeric resins which can be fabricated by melt extrusion, we have now found that if from about 0.05 to 2.0 weight percent of a liquid is incorporated into the mixture of the polymeric resin and from about 0.05 to 25 weight percent of a thermally decomposable chemical compound that upon extrusion of such a mixture and the withdrawing of the gaseous products formed during the extrusion process through the surface of the semi-molten extrudate that a porous polymeric article can be produced. Any suitable extruding equipment can be employed in the practice of the process of the present invention.

The polymeric resins which can be fabricated by melt extrusion and which are useful in producing the porous polymeric articles are any suitable resin including polyolefins, such as polyethylene, polypropylene, polybutene, polystyrene, ethylene copolymers and styrene copolymers, polyamides, such as polyhexamethylene adipamide and polycaprolactam, acrylic resins, such as polymethyl methacrylate and methyl methacrylate copolymers, polyethers, such as polyoxymethylene, halogenated polymers, such as polyvinyl chloride, polyvinyldene chloride, polychlorotrifluoroethylene, and copolymers of tetrafluoroethylene and hexafluoropropylene, polycarbonate resins. In addition, other suitable polymers such as acrylonitrile-butadiene-styrene polymers can be utilized as the resin constitute in the production of the porous articles of the present invention. The resins which have shown themselves to be outstanding in the process of the present invention are the polyolefin resins, such as polyethylene and polypropylene, halogenated polymers, such as polyvinyl chloride, and a polymer of acrylonitrile-butadiene-styrene prepared in accordance with the procedure disclosed in U.S. Pat. No. 3,238,275.

The thermally decomposable compound employed in the extrusion mixture in producing the porous polymeric articles must be inert in the sense that they will not react with the polymeric resin under the extrusion conditions. In addition such compounds must be thermally decomposable to a gaseous state at the extrusion conditions. Thus, any solids which decompose into gaseous products at the extrusion temperatures, as well as any volatile liquids, may be employed as the thermally decomposable chemical compound ingredient employed in the extrusion process. Solids which are suitably employed in the process of the present invention include the so-called azo compounds, such as azoisobutyric dinitrile, $\alpha$, $\alpha$-azobisisobutyronitrile, diazoamino benzene, 1,3-bis(p-xenyl) triazine and other similar azo compounds which decompose at temperatures below the extrusion temperature of the resinous composition. Commonly used inert thermally decomposable solid compounds which produce either nitrogen or carbon dioxide, such sodium bicarbonate, oleic acid, ammonium carbonate, mixtures of ammonium carbonate and sodium nitrite, and the like, may be used in the process of the present invention. Volatile liquids which are suitable as the thermally decomposable chemical compound employed in the present invention include hydrocarbons, such as acetone, methyl ethyl ketone, ethyl acetate, methyl chloride, ethyl chloride, chloroform, methylene chloride, methylene bromide and, other liquid volatile hydrocarbons which contain fluorine. As will be apparent to those skilled in the art, any other suitable thermally decomposable chemical compound can be utilized providing it is inert to the polymeric resin and decomposes at a temperature below the extrusion temperature of the extruding mixture.

As previously mentioned, we have found that a third ingredient in the extruding mixture is necessary if polymers and copolymers of mono-1 olefins and the like are to be employed as the resin compound of the extrusion mixture to produce the porous articles according to the process of the present invention. Further, we have found that very critical limitations are necessary regarding this third ingredient, e.g, the liquid component of the extrusion mixture. In addition, any suitable liquid which is inert to the resin component and the thermally decomposable chemical compound constitutents of the mixture can be employed provided it possesses properties which allow it to be fluid under the operating conditions, e.g. temperature and pressure, of the extruder but has a rapid, if not violent, transition to a gas at the nozzle portion of the extruding die. However, because of economical reasons and the simplicity in handling such a liquid, we normally prefer to use water as the fluid constituent. The quantity of fluid constituent of the extrusion composition will vary somewhat depending upon the particular resin employed and the thermally decomposable chemical compound employed in the mixture. However, we have found it desirable to maintain the concentration of the fluid constituent between 0.05 and 2.0 weight percent based on the total weight of the composition. As is apparent, the amount of liquid employed is relatively small but, at the same time, when extruding mono-1 olefin polymers and copolymers the elimination of the liquid resulted in an article which was nonporous regardless of the extrusion procedure and conditions. Further, when employing polymers such as acrylinitrile-butadiene-styrene polymers, we have found that the addition of the liquid enables one to continuously produce a porous article which can be reproduced exactly from one article to the next.

In practicing the process of the present invention for preparing porous polymeric articles, the desired polymeric resin is admixed with from about 0.05 to 25 weight percent of the thermally decomposable chemical compound and from about 0.5 to 2.0 weight percent of the fluid constituent to produce the desired extrusion mixture. The liquid ingredient can either be added directly in the desired quantities to the polymeric resin and thermally decomposable chemical compound or, when water is employed as the liquid constituent, such may be readily be added by storing the mixture of the polymeric resin and thermally decomposable chemical compound in a humidity controlled room for an effective period of time to insure that the desired amount of water is present within the mixture. Once the extrusion mixture containing the three components is thoroughly admixed, the mixture is introduced into an extruder and extruded at a suitable temperature and pressure to produce the desired extrudate while at the same time insuring decomposition of the chemical compound. While it is evident that the temperature and pressure at which the mixture is extruded will vary depending upon the particular polymeric resin employed, generally the operating conditions for the extruder are within the range of about 100° to 400°C and a pressure within the range of about 500 to 10,000 P.S.I.G. While the extrusion mixture is within the extruder the thermally decomposable chemical compound is decomposed, but during the retention time of the mixture within the extruder the decomposition products are dissolved within the resin matrices at the pressure under which the extruder is operated. When the extrudate is subjected to the atmosphere while in a semi-molten state, a portion of the decomposition products in the form of a gas or vapor and the gasified liquid component exit from the extrudate, but, at the same time, a portion of the decomposition products are maintained within the extrudate. The remainder of the decomposed chemical compound is then withdrawn through the surface of the extrudate by differential pressure while the extrudate is in a semi-molten state. The extrudate, after removal of the decomposed chemical compound and the gasified liquid component is then passed through a cooling zone wherein the extrudate is solidified and thus produces the porous article as desired.

In order to more fully describe the process of the present invention, the following examples are set forth. However, it should be understood that these examples are merely for purposes of illustration and such are not to unduly limit the scope of the present invention.

EXAMPLE I

This example depicts the necessity of the presence of a liquid, as previously described, in the polymeric resin mixture which is to be melt extruded to produce porous articles having uniform micro porosity. The resinous mixture employed contained 0.18 percent of an azo-type blowing agent (manufactured and sold by Borg Warner Corporation) and 99.82 per cent acrylonitrile-butadiene-styrene polymer which had been thoroughly dried. The mixture was then extruded through a conventional extruder which was operated so that the temperature within the barrel was about 350°F and the temperature of the die was about 400°F. The extrudate formed was then passed through a cooling zone in which was maintained a vacuum of 5 to 8 inches of water to solidify said extrudate. Upon examination the extrudate contained no porosity and thus it is shown that the presence of a liquid in the resin mixture is a major factor in control of porosity.

EXAMPLE II

An experiment was conducted to determine if an increase in the amount of the azo-type blowing agent described above would produce a micro porous article having uniform porosity. The resin mixture employed contained 0.75 per cent of the blowing agent and 99.25 per cent dried acrylonitrile-butadiene-styrene polymer. The extrusion conditions were the same as in EXAMPLE I except the vacuum in the cooling zone was maintained at 3 to 18 inches of water. After the extrudate had cooled it was inspected and tested for porosity. These results showed no porosity and resulted in an article having poor physical properties. This experiment illustrates that the use of additional blowing agent alone will not enable one to produce a micro porous article having controlled porosity. Further, the example illustrates that increasing the differential pressure across the wall of the extrudate has no affect under these conditions.

EXAMPLE III

A series of experiments was conducted in which a liquid was added to the polymeric resin extrusion mixture prior to extrusion of same. The extruder conditions were substantially the same as those of EXAMPLE I.

In one experiment 0.025 per cent water was added to the resin mixture containing 0.23 per cent of the blowing agent and 99.745 per cent dry acrylonitrile-butadiene-styrene. The extrudate produced from the resin was found to contain no porosity.

In another experiment 0.05 per cent water was added to the resin mixture containing 99.72 per cent dry acrylonitrile-butadiene-styrene and 0.23 per cent of the blowing agent. The extrudate produced from the resin was found to exhibit porosity.

Another experiment was conducted wherein 0.1 per cent water was added to the resin mixture containing 99.67 percent acrylonitrile-butadiene-styrene and 0.23 per cent blowing agent. The extrudate produced from the resin indicated a micro porous article having good controlled porosity and an article with desirable physical properties, such as wall thickness and appearance.

In a similar experiment 0.20 per cent water was added to the resin mixture containing .23 per cent blowing agent and 99.57 per cent dry acrylonitrile-butadiene-styrene. The extrudate produced from the resin was extremely porous and the physical properties of the extrudate were not as good as those of the extrudate produced from the resin mixture containing 0.1 per cent water.

EXAMPLE IV

Once the addition of the liquid in the proper amounts had been determined, a series of experiments was conducted wherein the amount of the blowing agent was increased to 0.38 per cent. The conditions of extrusion were substantially the same as hereinbefore described. The results of these experiments were that articles produced from a resin mixture containing .38 per cent blowing agent, 0.075 per cent water and 99.695 per cent dry acrylonitrile-butadiene-styrene had excellent physical properties, such as appearance and strength, and had uniform micro porosity throughout. The same results were found when 0.10 per cent water was used.

EXAMPLE V

In an effort to determine if the liquid alone was causing the micro porosity in the article an experiment was run using a resin which contained 0.15 per cent water and 99.85 per cent dry acrylonitrile-butadiene-styrene. The extrudate produced, upon examination and testing, showed an article having no porosity.

The above data clearly indicates the need of the presence of a liquid in an amount of from about 0.05 to 2 per cent by weight in a resin mixture containing from about .05 to 25 weight per cent of a thermally decomposable chemical compound. The data further illustrates that exceptional results are obtained when the liquid is present in an amount of about 0.1 to 0.15 weight per cent and the thermally decomposable compound is present in an amount of about 0.23 to about 0.38 per cent. Further, other experimental work has shown that when the polymeric resin component is a polymer of a mono-1 olefin, such as polyethylene, polypropylene or a halogenated polymer, such as polyvinyl chloride, that the same critical conditions as to the liquid and the blowing agent apply.

It will be understood that various changes in the details, materials and steps, which have been herein described and illustrated in order to explain the nature of the invention, may be made by those skilled in the art within the principle and scope of the invention.

Having thus described the invention, we claim:

1. A method for producing a porous article from polymeric resins selected from the group consisting of polymers of mono-1-olefins, copolymers of mono-1-olefins, polyamids, acrylic, polyethers, halogenated polymers and copolymers, polycarbonate, and polymers of acrylonitrile-butadiene-styrene, which can be fabricated by melt extrusion which consists essentially of (a) admixing said polymeric resin with from about 0.05 to 25 weight percent of a thermally decomposable chemical compound which will decompose at a temperature below that employed in melt extrusion and wherein said decomposable compound is selected from the group consisting of azo-compounds, and solid compounds which produce carbon dioxide on decomposition; (b) incorporating in and maintaining from about 0.05 to 2 weight percent of an inert liquid in the mixture of step (a), said inert liquid further being characterized as having liquid properties under extrusion conditions but which rapidly changes to a gas where an extrudate formed from said mixture is withdrawn from an extrusion die; (c) introducing said mixture containing said liquid into an extruder; (d) extruding said mixture containing said liquid under temperature and pressure conditions wherein said thermally decomposable chemical compound decomposes, said liquid is maintained in the liquid state while in the extruder, and said liquid in the extrudate issuing from the extruder violently translates to a gaseous state; (e) and withdrawing gaseous products of the decomposition of the decomposable chemical compound and the liquid through the surface of said extrudate by differential pressure while same is in a semimolten state; and (f) recovering a porous article.

2. The method of claim 1, wherein said polymeric resin is selected from polyethylene, polypropylene, polyvinyl chloride and acrylonitrile-butadiene-styrene.

3. The method of claim 2 wherein said extruder is operated at a temperature within the range of about 100° to 400° C and at a pressure within the range of about 500 to 10,000 P.S.I.G.

4. The method according to claim 3 wherein said liquid is water.

5. The method according to claim 4 wherein said water is present in an amount of about 0.1 to 0.15 weight percent.

* * * * *

UNITED STATES PATENT AND TRADEMARK OFFICE
CERTIFICATE OF CORRECTION

PATENT NO. : 3,912,800

DATED : October 14, 1975

INVENTOR(S) : Frank E. Edlin; Joseph M. Tucker, Jr.

It is certified that error appears in the above-identified patent and that said Letters Patent are hereby corrected as shown below:

In the Notice [*], that portion of the disclaimer reading "Nov. 14, 1975" should read -- Sept. 14, 1991--.

Signed and Sealed this

Eighth Day of February 1983

[SEAL]

Attest:

GERALD J. MOSSINGHOFF

Attesting Officer  Commissioner of Patents and Trademarks